(12) United States Patent
Solazzo et al.

(10) Patent No.: US 10,589,620 B2
(45) Date of Patent: Mar. 17, 2020

(54) DEVICE AND METHOD FOR FAN-BASED DEICING OF AIR DOOR ASSEMBLIES

(71) Applicant: Röchling Automotive SE & Co. KG, Mannheim (DE)

(72) Inventors: Domenico Solazzo, Worms (DE); Anton Pfeifer, Leifers (IT)

(73) Assignee: RÖCHLING AUTOMOTIVE SE & CO. KG, Mannheim (DE)

( * ) Notice: Subject to any disclaimer, the term of this patent is extended or adjusted under 35 U.S.C. 154(b) by 99 days.

(21) Appl. No.: 15/790,699

(22) Filed: Oct. 23, 2017

(65) Prior Publication Data

US 2018/0118015 A1 May 3, 2018

(30) Foreign Application Priority Data

Nov. 2, 2016 (DE) .................. 10 2016 221 503

(51) Int. Cl.
*B60K 11/06* (2006.01)
*F28F 19/00* (2006.01)
(Continued)

(52) U.S. Cl.
CPC .............. *B60K 11/06* (2013.01); *B60K 11/04* (2013.01); *B60K 11/085* (2013.01); *F01P 5/043* (2013.01);
(Continued)

(58) Field of Classification Search
CPC ....... B60K 11/04; B60K 11/06; B60K 11/085; B60K 11/08; F01P 5/043; F01P 11/20; F01P 7/10; F28F 19/006
(Continued)

(56) References Cited

U.S. PATENT DOCUMENTS 8,910,705 B2 * 12/2014 Miura .................. B60H 1/02
165/122
9,045,043 B2 6/2015 Hoke
(Continued)

FOREIGN PATENT DOCUMENTS

DE 102012010891 A1 12/2013
DE 102013214286 B4 11/2015

OTHER PUBLICATIONS

German Search Report for corresponding DE 10 2016 221 503.5 dated Jul. 13, 2017, 11 pgs.
(Continued)

*Primary Examiner* — Joel M Attey
(74) *Attorney, Agent, or Firm* — Rankin, Hill & Clark LLP

(57) ABSTRACT

A motor vehicle component assembly including an air door assembly having an air door frame, on which at least one air door is movably arranged for adjusting the area through which air can flow in an air flow opening; a heat source that can include a coolant heat exchanger and/or an internal combustion engine; a blower which in the rated operating mode generates an operating air flow from the air door assembly toward the heat source; a sensor device that detects at least one operating variable and/or one state variable of the motor vehicle component assembly, and/or one state variable of the area surrounding the motor vehicle component assembly, and on the basis of this detection, outputs at least one detection variable; and a control device, which is configured to control the operation of the blower, the control device being configured to operate the blower, based on the at least one detected variable, in a deicing mode that is different from the rated operating mode, in which the blower generates a deicing air flow from the heat source toward the air door assembly.

3 Claims, 2 Drawing Sheets

(51) Int. Cl.
*B60K 11/08* (2006.01)
*B60K 11/04* (2006.01)
*F01P 5/04* (2006.01)
*F01P 11/20* (2006.01)
*F01P 7/10* (2006.01)

(52) U.S. Cl.
CPC .............. *F01P 7/10* (2013.01); *F01P 11/20* (2013.01); *F28F 19/006* (2013.01); *B60K 11/08* (2013.01); *F01P 2005/046* (2013.01); *F01P 2025/13* (2013.01); *F01P 2025/48* (2013.01); *Y02T 10/88* (2013.01)

(58) Field of Classification Search
USPC ........................................................ 165/287
See application file for complete search history.

(56) References Cited

U.S. PATENT DOCUMENTS

| | | | |
|---|---|---|---|
| 2015/0088400 A1* | 3/2015 | Buhler | B60K 11/085 701/102 |
| 2015/0136353 A1* | 5/2015 | Niemann | B60H 1/00207 165/41 |
| 2015/0159541 A1 | 6/2015 | Solazzo | |

OTHER PUBLICATIONS

Espacenet Bibliographic dataDE102012010691 (A1), Published Dec. 5, 2013, 1pg.
Espacenet Bibliographic dataDE102013214266 (B4), Published Nov. 19, 2015, 3pgs.

* cited by examiner

DEVICE AND METHOD FOR FAN-BASED DEICING OF AIR DOOR ASSEMBLIES

The present invention relates to a motor vehicle component assembly comprising an air door assembly having an air door frame, on which at least one air door is movably arranged for adjusting the area through which air can flow in an air flow opening formed in the air door frame, a heat source, for example in the form of a coolant heat exchanger and/or an internal combustion engine, a blower, in particular a cooling blower, which in the rated operating mode generates a flow of air from the air door assembly toward the heat source, a sensor device that detects at least one operating variable and/or one state variable of the motor vehicle component assembly and/or one state variable of the area surrounding the motor vehicle component assembly, and on the basis of this detection, outputs at least one detected variable, and a control device, which is configured to control the operation of the blower.

Motor vehicle component assemblies of this type are used in many vehicles. The present invention relates specifically to the deicing of the air door assembly in such a motor vehicle component assembly.

BACKGROUND OF THE INVENTION

Air door assemblies as described above are typically used on the fronts of vehicles to adjust the flow of cooling air through the air flow opening in the air door frame to meet the cooling requirements of the internal combustion engine and the units surrounding it. The at least one air door of the air door assembly is generally motor driven by means of an actuator, with operation being controlled via an air door control device, which may be part of a vehicle control device. The air door control device can control the operation of the air door assembly, i.e. the adjustment of the at least one air door relative to the air flow opening, on the basis of parameters such as the temperature of the coolant in a coolant circuit and/or the temperature of the oil in an oil circuit of the internal combustion engine, and/or according to other parameters.

The air door assembly is used to decrease the amount of time required by the internal combustion engine to heat up to its rated operating temperature. This enables the emission levels of the internal combustion engine during vehicle operation to be reduced, since the internal combustion engine emits fewer pollutants in its exhaust gas at its rated operating temperature than at other operating temperatures, in particular at cold operating temperatures immediately following a cold start.

Under cold weather conditions, for example during the winter, and in colder regions, for example closer to the poles, at other times of the year as well, the air door assembly can freeze up.

Currently, when immobility or limited mobility of the air door assembly caused by icing is detected, attempts are made to break up the ice by increasing the drive torque or the drive power of the air door actuator and, if necessary, by operating the air door assembly in alternating directions. This is accompanied by a substantial increase in the mechanical load on all the components located between the air door actuator and the at least one driven air door, as well as on the connections between the individual components. As a result, the service life of the air door assembly is unnecessarily reduced. Moreover, a successful breaking up of ice on the air door assembly is often accompanied by considerable noise generation.

From DE 10 2013 214286 B4, it is known to deice a radar sensor located in the bumper of a motor vehicle by using air from a ventilation hose which is provided for ventilating the passenger compartment.

A deicing device for the zonal deicing of glass surfaces on a motor vehicle is known from DE 10 2014 201969 A1. In that case, the glass surfaces are deiced by means of electrical resistance heating elements.

SUMMARY OF THE INVENTION

It is therefore an object of the present invention to provide a motor vehicle component assembly of the type mentioned at the outset that will enable the air door assembly to be deiced in a manner that is quieter and places less stress on the air door assembly, without introducing additional component assemblies into the vehicle.

This object and others is achieved according to the invention by a motor vehicle component assembly of the type described above, which is developed such that the control device is configured to operate the blower, based upon the at least one detected or detection variable, in a deicing mode, which is different from the rated operating mode, and in which the blower generates an air flow from the heat source to the air door assembly.

The basic concept therefore involves using heat sources that are already present in the vehicle to deice the air door assembly. Suitable heat sources include, in particular, the heat exchangers of the coolant circuit and/or the internal combustion engine.

In principle, the blower may be any blower already existing in the vehicle. The blower of a cooling blower in a motor vehicle, which is used to generate an air flow for convective cooling in the event that the air flow of the air stream is insufficient for such convective cooling, is preferred on account of both its high performance and its spatial proximity to the air door assembly.

In the vast majority of cases, the cooling blower is located behind the heat exchanger of the coolant circuit, as viewed in the direction from the vehicle front to the vehicle rear, to allow the air flow generated by driving the motor vehicle to reach the heat exchanger, if possible without blockage by any components. In the rated operating mode, to bolster the air flow generated by driving the motor vehicle or to substitute for said air flow when the vehicle is standing still, the cooling blower generates a flow of air in the direction from the air door assembly, which is still typically located in front of the heat exchanger, through the coolant heat exchanger to the internal combustion engine, which is typically located behind the cooling blower.

In contrast, in the deicing mode the direction of the air flow generated by the blower, in particular the cooling blower, is reversed or diverted in such a way that the air flow generated by the blower flows from the heat source toward the air door assembly. Heat can thereby be transported from the heat source to the air door assembly, where it can be used for heating and thus for deicing.

An air flow "flowing toward the air door assembly" is understood as any air flow generated by the blower that reaches at least one component or one component assembly from the group comprising the at least one air door, the air door frame, an actuator as a drive for moving the at least one air door and/or a linkage and/or transmission for transmitting motion from an output element of the actuator to the at least one air door.

In principle, the change in the direction of the air flow generated by the blower in the deicing mode—as compared with the direction of flow in the rated operating mode—can be brought about by a system of conduits and doors in that by adjusting the doors, for example, conduit pathways that are closed in the rated operating mode are opened for the deicing mode. The air flow generated by the blower can then flow fully or partially through the conduit pathways in the above-stated direction from the heat source toward the air door assembly.

However, the use of such conduit pathways and the associated additional conduit pathway components can be avoided if the control device is configured to reverse the direction of rotation of the fan wheel of the blower. Depending upon the drive motor of the fan wheel, this can be achieved by a polarity reversal or, in the case of modern BLDC drive motors, by using software technology. In the deicing mode, rather than drawing air in through the heat exchanger and blowing it out toward the internal combustion engine, as is the case in the rated operating mode, the blower or its fan wheel blows air through the heat exchanger, where it can be heated, and then toward the air door assembly, where it can emit the heat it has absorbed in the heat exchanger, thereby increasing the temperature of components of the air door assembly. The intake side and the discharge side of the blower are thus preferably reversed in the deicing mode. If the internal combustion engine, for instance the solid engine block, has already been operating for a short time and is thus heated relative to the ambient temperature, then in the deicing mode the blower will draw in air that has already been heated in the area around the internal combustion engine, and that can be heated further as it passes through the heat exchanger by the likewise heated coolant present therein, before it reaches the air door assembly for the purpose of deicing.

If the internal combustion engine and/or the coolant heat exchanger are cold, deicing can be started once the internal combustion engine and the coolant heat exchanger have been started up and heated sufficiently. In such an operating state, the deicing mode is preferably started before the internal combustion engine and/or its coolant have reached their rated operating temperature. This ensures that the deicing operation will not cause the internal combustion engine to overheat.

To ascertain whether deicing of the air door assembly is even necessary, the sensor device can comprise at least one temperature sensor assembly. This temperature sensor assembly, which can include one or more temperature sensors, can detect the ambient temperature around the motor vehicle, for example, as the state variable of the vehicle environment. Alternatively or additionally, it can detect the temperature of a component of the air door assembly as the state variable. The control device can be configured to operate the blower in deicing mode when at least one temperature detected by the temperature sensor assembly is below a predetermined threshold temperature. In that case, it is assumed that if the temperature is below a predetermined threshold temperature, icing of the air door assembly is extremely likely.

As was stated at the outset, the air door assembly preferably has an electrical adjustment drive for adjusting the at least one air door relative to the air door frame in order to influence the flow of air through the air flow opening in the air door frame. For a particularly reliable determination of a need for deicing, in addition or as an alternative to the above-mentioned temperature detection, the sensor device is preferably configured to detect the drive current of the adjustment drive as an operating variable of the air door assembly. As a rule, the drive torque generated by an electric drive is proportional to the motor current or drive current flowing through the actuator during the supply of the drive torque. Therefore, the control device is preferably additionally or alternatively configured to operate the blower in deicing mode when the drive current detected by the sensor device reaches or exceeds a predetermined threshold value for current.

Drive current and temperature are preferably sensed to enable the state of the air door assembly to be ascertained as reliably as possible. This is because the air door assembly may also become immobilized by factors other than icing, for example by soiling. In such cases, an attempt to actuate the air door assembly would cause the drive current to increase, but a temperature sensor would indicate that at the prevailing ambient temperatures, freezing of the air door assembly is unlikely or even impossible. In that case, it would make no sense for the blower to implement deicing according to the present invention, since no ice would actually be present.

Similarly, ambient temperatures may be low without the air door assembly icing up as a result. In such cases, the deicing mode according to the invention is not necessary.

In the event of a reversal in the direction of rotation of the blower fan wheel, the control device is configured to transmit corresponding information to the vehicle controller, so that the vehicle controller can correctly detect or ascertain the operating state of the motor vehicle.

The present invention further relates to a motor vehicle having a motor vehicle component assembly according to any of the preceding claims.

The object stated at the outset is additionally achieved by a method for deicing an air door assembly in a motor vehicle which has a coolant heat exchanger, an internal combustion engine and a cooling blower for generating a forced air flow through the coolant heat exchanger, the forced air flow traveling from the air door assembly through the coolant heat exchanger during rated operation of the cooling blower, and the deicing method comprising the following step: using the cooling blower to generate a deicing forced air flow that flows through the coolant heat exchanger to the air door assembly.

According to the above description of the device, the method can involve detecting the ambient temperature and/or the temperature of at least one component of the air door assembly and/or detecting the drive current of an adjustment drive of the air door assembly, and on the basis of this detection, actuating the cooling blower to generate the forced air flow for deicing.

Specifications provided regarding the device according to the invention also apply to the method according to the invention, and vice versa. The advantageous refinements of the device described above also disclose advantageous refinements of the method.

These and other objects, aspects, features, refinements and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
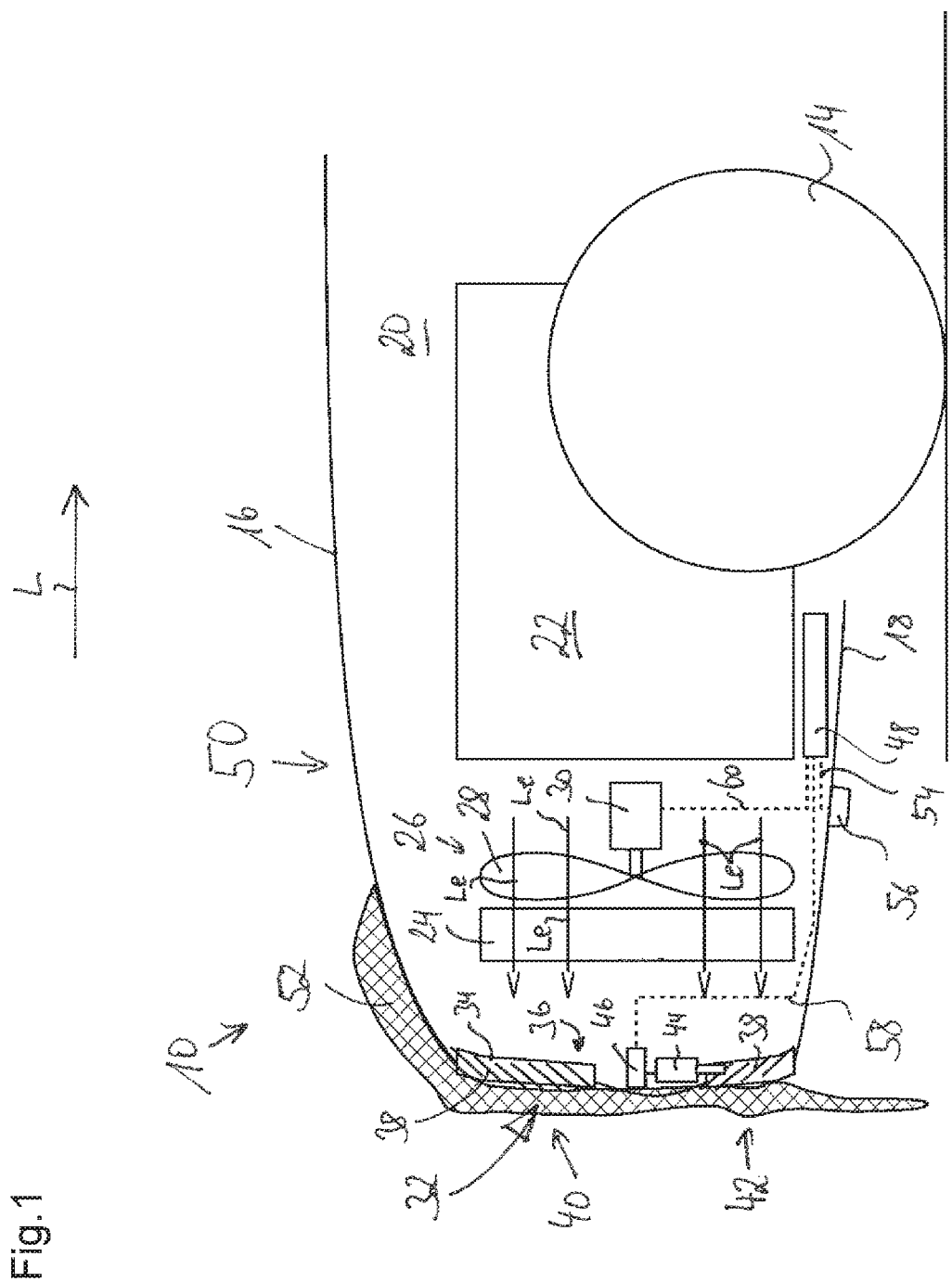
FIG. 1 is a rough schematic side view of the front end of a motor vehicle with the air door assembly iced up.

Referring now to the drawings wherein the showings are for the purpose of illustrating preferred and alternative embodiments of the invention only and not for the purpose of limiting the same, FIG. 1 shows a rough schematic diagram of the front end of a motor vehicle, designated generally as 10. Front end 10 of the motor vehicle comprises a front wheel 14, an engine hood 16, and an underbody 18. In an engine compartment 20 formed in the vertical direction between underbody 18 and engine hood 16, an internal combustion engine 22 is accommodated in a manner that is known per se.

Internal combustion engine 22 is likewise cooled in a manner that is known per se by a liquid coolant, which passes through the engine block of internal combustion engine 22 and emerges therefrom heated. The heated coolant is then fed to a coolant heat exchanger 24, where it is cooled convectively by a flow of air. The cooled coolant is then returned in a circuit to the engine block of internal combustion engine 22, from which it extracts heat, becoming heated itself, and is returned once again to coolant heat exchanger 24, where it releases this heat to the surrounding air.

A cooling blower 26, which includes a fan wheel 28 and a fan drive 30, is typically located between coolant heat exchanger 24 and internal combustion engine 22, or at least behind coolant heat exchanger 24 in the vehicle longitudinal direction L. Fan drive 30 is generally a rotary electric motor.

In vehicle longitudinal direction L (which is the direction leading from the vehicle front toward the vehicle rear), an air door assembly 32 is positioned in front of coolant heat exchanger 24. Vehicle longitudinal direction L is parallel to the drawing plane of FIG. 1.

Air door assembly 32 comprises an air door frame 34, shown only schematically, which surrounds an air flow opening 36 that extends orthogonally and parallel to the drawing plane of FIG. 1. On air door frame 34, a plurality of air doors 38 are arranged substantially parallel to one another and extending through air flow opening 36. For the sake of clarity, only two air doors 38 are provided with reference symbols.

Air doors 38 are each arranged on air door frame 34 so as to pivot about a pivot axis that is orthogonal to the drawing plane of FIG. 1. In the exemplary embodiment shown, air doors 38 can be combined into an upper air door group 40 and a lower air door group 42. Air doors 38 belonging to a common air door group 40 or 42 are coupled to enable collective pivoting movement about their respective parallel pivot axes. It is also possible for all of air doors 38 to be coupled for collective pivoting movement. The coupling for the purpose of pivoting movement is not shown in FIG. 1.

Air door assembly 32 comprises at least one actuator 44, by means of which air doors 38 can be driven in an adjusting movement about their respective pivot axes. Each air door group 40 and 42 can have its own actuator to allow the air doors 38 of one air door group to be moved separately from the air doors 38 of the other air door group.

The operation of actuator 44 of air door assembly 32 is controlled via an air door control device 46.

The operation of cooling blower 26 is controlled via a control device 48. Each of control devices 46 and 48 can be connected in terms of signal transmission to a vehicle controller (not shown in FIG. 1).

Air door assembly 32, coolant heat exchanger 24 and/or internal combustion engine 22 as heat source(s), cooling blower 26, and control device 48 together form a motor vehicle component assembly 50 as claimed.

In the rated operating mode, which is the normal operating mode of cooling blower 26 for the majority of its operating time, cooling blower 26 generates an air flow Ln that flows in the direction from air door assembly 32 through coolant heat exchanger 24, if necessary up to internal combustion engine 22. When the vehicle is moving, cooling blower 26 may be operated as a supplement to the air stream flowing in the same direction to intensify convective cooling at the coolant heat exchanger 24, and when the vehicle is stationary, the cooling blower may be operated as the sole source of convective cooling of the coolant in the coolant heat exchanger 24.

In FIG. 1, air door assembly 32 is immobilized due to icing, for instance by a layer of ice 52 that has formed on the front end of engine hood 16 and in front of a radiator grille. As a result, air doors 38 of air door assembly 32 cannot be moved, and therefore, the cross-sectional area of air flow opening 36 through which air is able to flow undesirably cannot be adjusted.

Control device 48 can be connected via a data line 54 to at least one temperature sensor 56, which detects the temperature of the environment outside the vehicle and transmits this temperature via line 54 to control device 48.

In addition, air door control device 46 can detect the drive current flowing through actuator 44 when actuator 44 is triggered for the purpose of moving air doors 38, and can transmit this drive current via a data line 58 to control device 48.

If the drive current detected by air door control device 46 exceeds a predetermined threshold for drive current, while at the same time, the ambient temperature detected by temperature sensor 56 is below a predetermined threshold for temperature, control device 48 will conclude that air door assembly 32 is iced up, and will initiate deicing of air door assembly 32.

For this purpose, fan drive 30 is actuated via data line 60 to drive fan wheel 28 in the direction of rotation opposite the direction used in the rated operating mode of fan drive 30, causing cooling blower 26 to generate an air flow Le that flows through coolant heat exchanger 24 to air door assembly 32. This allows the air to draw heat from coolant heat exchanger 24, and thus heated, to travel over air doors 38, air door frame 34, actuator 44, etc. thereby heating said components. This causes ice layer 52 to melt.

With the preferred spatial arrangement, implemented in many vehicles, of air door assembly 32, coolant heat exchanger 24, cooling blower 26 and internal combustion engine 22 in the vehicle longitudinal direction L, if internal combustion engine 22 contains residual heat, then during the deicing mode shown in FIG. 1, air which has already been heated by internal combustion engine 22 can be drawn in by cooling blower 26 and moved through coolant heat exchanger 24 to air door assembly 32.

The deicing mode proposed in the present application thus advantageously functions even when the vehicle is standing still and internal combustion engine 22 is switched off, if residual heat from previous operation remains stored in the coolant of the vehicle's coolant circuit and/or in internal combustion engine 22, and can be used for heating and deicing air door assembly 32 according to the above-described deicing mode of cooling blower 26.

Figure 2:
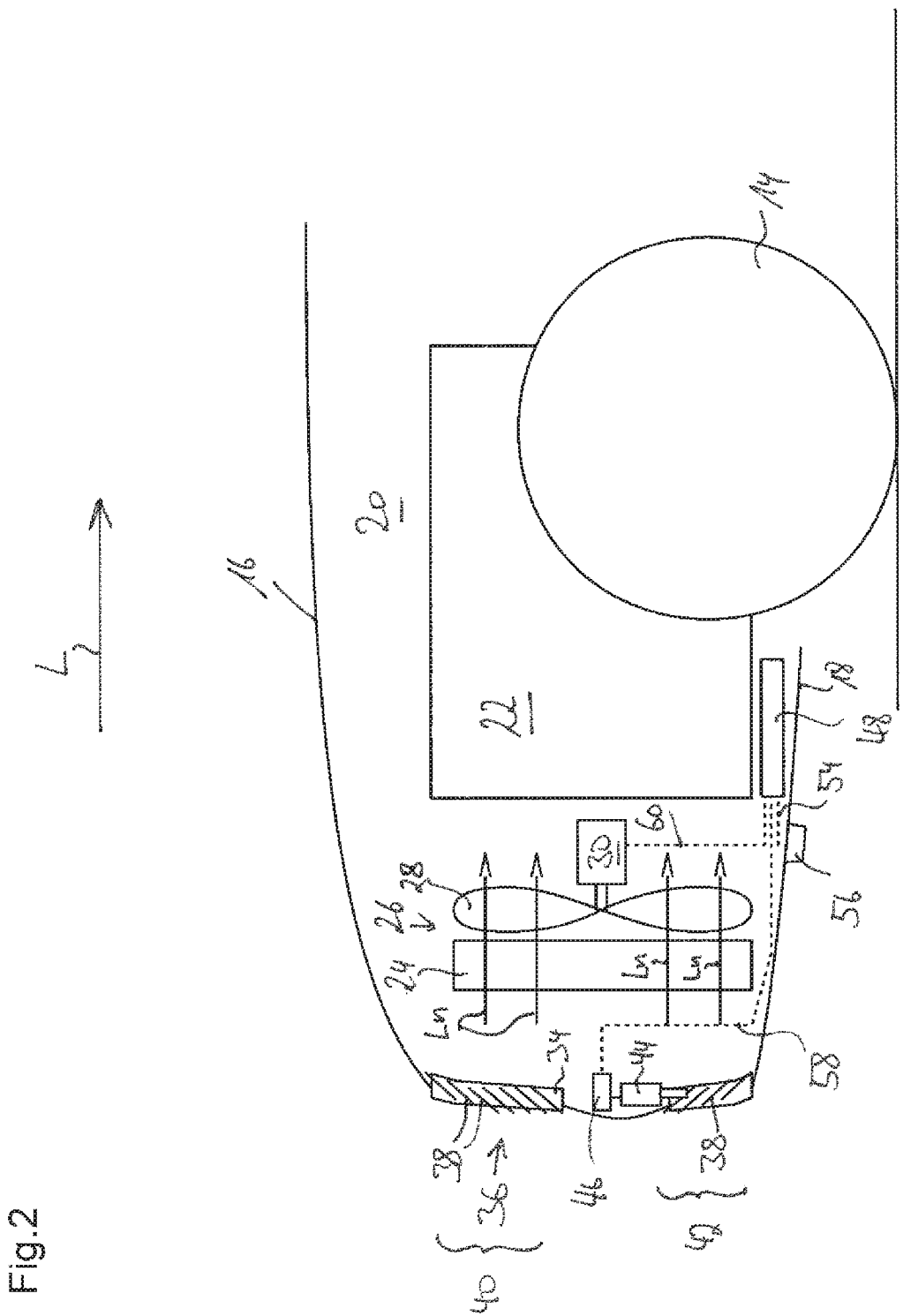
FIG. 2 is the rough schematic side view of FIG. 1 after deicing of the air door assembly.

FIG. 2 shows the deiced air door assembly 32 and the rated operating mode of cooling blower 26.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A vehicle component assembly comprising:
  an air door assembly having an air door frame, on which at least one air door is movably arranged for adjusting the area through which air can flow in an air flow opening formed in the air door frame, the air door assembly further including at least one door actuator operable connected to the at least one air door to adjust the at least one air door relative to the air door frame;
  a heat source in the form of a coolant heat exchanger of a coolant circuit for an internal combustion engine;
  a blower which in a rated operating mode generates an operating air flow from the air door assembly toward the associated heat source;
  at least one temperature sensor operable to detect an ambient temperature;
  a drive current sensor operable to detect a drive current of the at least one door actuator; and
  wherein the blower is switchable between the rated operating mode and a deicing mode that is different from the rated operating mode wherein in the deicing mode the blower generates a deicing air flow from the heat source toward the air door assembly to deice the air door assembly, wherein the blower switches to the deicing mode when both the drive current exceeds a predetermined current threshold and the ambient temperature drops below a predetermined temperature threshold regardless of the position of the at least one air door.

2. The motor vehicle component assembly according to claim 1, wherein when the blower switches to the deicing mode, the direction of rotation of a fan wheel of the blower is reversed.

3. A motor vehicle having a motor vehicle component assembly according to claim 1.

* * * * *